May 13, 1941.   E. NORTH   2,242,041
SUPPORTING BRACKET
Filed Feb. 3, 1937
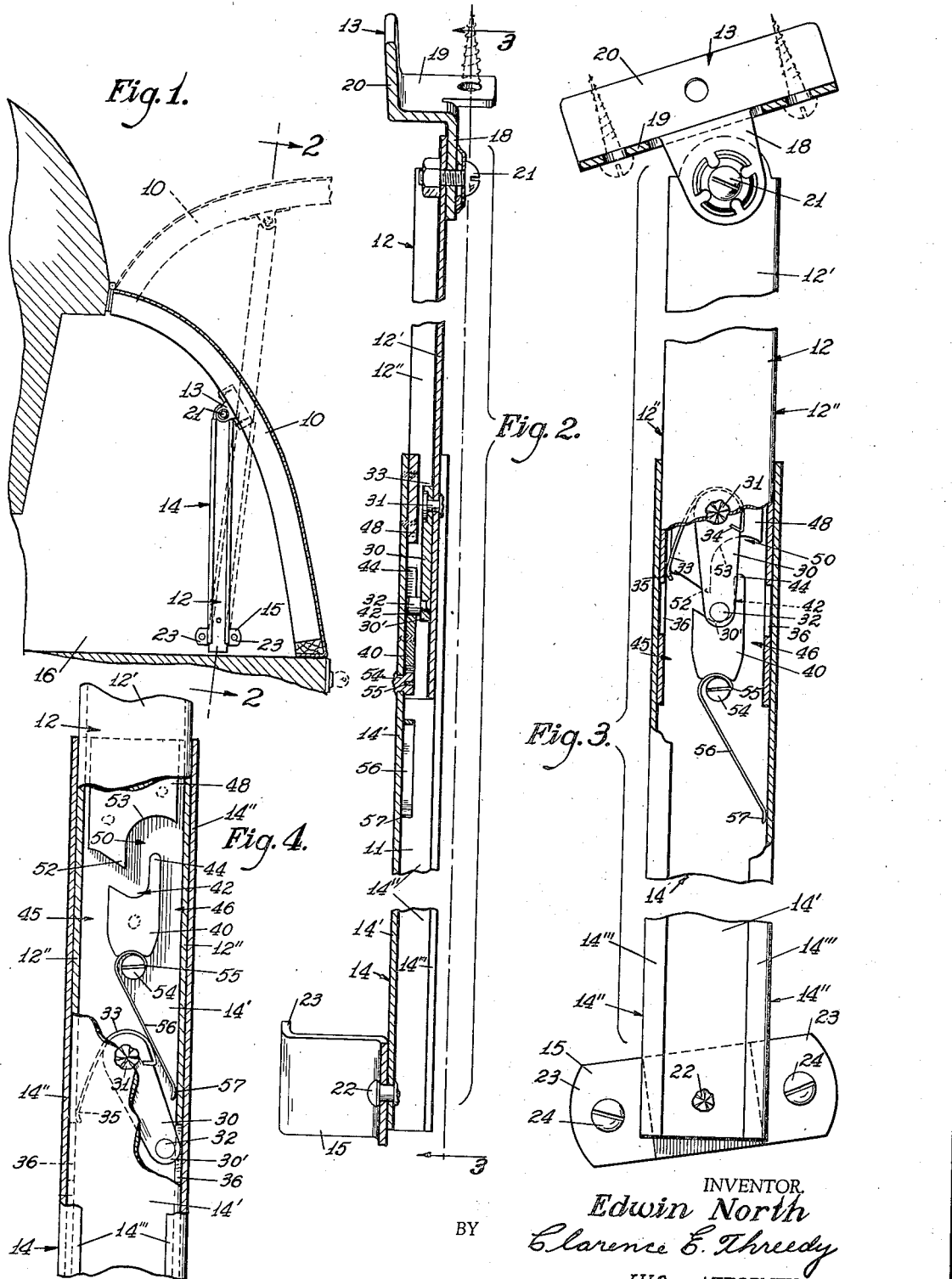
INVENTOR.
Edwin North
BY Clarence E. Threedy
HIS ATTORNEY.

Patented May 13, 1941

2,242,041

UNITED STATES PATENT OFFICE 2,242,041

SUPPORTING BRACKET

Edwin North, Rockford, Ill., assignor to National Lock Co., Rock Island, Ill., a corporation of Delaware Application February 3, 1937, Serial No. 123,805

7 Claims. (Cl. 217—60)

This invention relates to supporting brackets, and particularly to expansible brackets provided with self-latching means.

An important object of the invention is the provision of an expansible bracket having automatic latching means adapted to latch the arms of the bracket in expanded condition and automatically releasable by a slight additional movement of the arms in their expanding direction.

A further and more particular object of the invention is the provision of a novel expansible bracket including a pair of bracket arms slidable one within the other, one of the same having a latch arm and the other arm having a latch dog operable to engage the latch arm when the bracket is in extended condition to prevent collapsing movement of the several arms, the said latch arm and latch dog being operable for unlatching disengagement when said arms are moved slightly from extended and latch position further in the direction of extending or opening movement.

Still another object is the provision of a linearly expansible self-latching supporting bracket of general application, and especially suited as a hold-open bracket for the deck door of an automobile.

Other and more detailed objects and novel aspects of the invention will appear as the following description proceeds in view of the drawing, in which:

Fig. 1 is a fragmentary vertical section through the rear deck portion of an automobile showing the novel bracket in elevation and in collapsed condition;

Fig. 2 is an enlarged vertical section taken along lines 2—2 of Fig. 1 (bracket extended);

Fig. 3 is an enlarged side elevation of an extended bracket with portions cut away to show the latch mechanism, and is taken in the direction of lines 3—3 of Fig. 2; while Fig. 4 is an enlarged fragmentary section through the bracket arms showing the latch elements in elevation and in disengaged relation.

A preferred embodiment of my novel bracket is shown herein for illustrative purposes, and in Fig. 1 is applied as a means for maintaining the deck door 10 of an automobile in the raised dotted line position therein shown, the bracket comprising a pair of elongated arms 12 and 14 slidable one within the other and respectively provided with mounting brackets 13 and 15 attached to the deck door and to a side wall portion 16 of the car.

In the present embodiment, each of the bracket arms 12 and 14 is desirably in the form of an elongated channel arm, each having a bottom portion 12' and 14' respectively (Fig. 3), and each having upturned side walls 12" and 14" respectively, the bracket 12 being of lesser cross sectional dimension than the larger arm 14 so as to slide within the latter.

In their assembled relation arm 12 is slid into the channel of arm 14 and has its bottom wall 12' placed uppermost and opposite to the bottom wall 14' of the larger channel bracket, with the free edge portions of the side walls 12" riding against the inner surface of the bottom 14' of the receiving channel arm. Moreover, the larger channel arm 14 has the free upper edge portions of its side walls 14" upset and turned toward one another to provide flanges 14''' which prevent the lateral disengagement of the two channel arms, while at the same time permit their free relative sliding movement.

Brackets 13 and 15 attached at the respective extremities of the channel arms may assume various forms for different closure structures, but in the embodiment shown, the bracket 13 comprises a member of V-shape in section and having an attaching tongue 18 struck down from one side 19 of the V in a direction parallel to the other wall 20 of the bracket. Tongue 18 is secured to the upper end portion of the bracket 12 by nut and bolt means 21.

The bracket 15 in the embodiment shown comprises a U-shaped member having its bight or bottom portion pivotally attached to the lower end of the channel arm 14 by means of a rivet 22, and having its free end portions diverged to form arms 23 apertured to receive mounting screws or the like 24.

Assuming that the collapsible bracket is attached to the deck door of an automobile as in Fig. 1, it will be obvious that as the deck door 10 is raised and lowered the arms 12 and 14 will reciprocate slidably one within the other through their respective brackets 13 and 15 pivotally attaching them to the door and car body.

Novel means for maintaining the bracket arms in expanded condition is provided as seen particularly in Fig. 4, in the form of an elongated latch arm 30 pivotally mounted, as at 31, on the inner bottom surface 12' of channel arm 12. This latch arm is provided with a depending latch stud 32 adjacent its outer end portion 30', and is normally pivoted toward one side of the channel by means of a leaf spring 33 having a bent end portion 34 fitted into a notch in the edge of the arm and being bent around the pivoted end of the latch arm to have a free end portion 35 bear against one of the upstanding side wall portions 12" of the inner sliding bracket. The side wall portions 12" of the smaller bracket arm are cut away to form opposite openings or slots 36 at the point corresponding to the normal pivoted position of the free end of the latch arm 30, and are large enough to permit the end 30' of the latch arm to protrude therethrough so as to permit the latch stud 32 to bear close against the inner side walls 12" as seen in Fig. 4.

Mounted on the inner surface of the main or outer channel bracket 14, is a latch keeper 40 having a somewhat V-shaped notch 42 cut diagonally into the end of the keeper, the latch being secured to the bottom of the channel by means of spot welding or the like, and the notch forming a nose 44 at one (right-hand) side thereof and which is of importance in the unlatching operation hereafter to be described. The latch keeper 40 is dimensioned so as to provide short elongated side channels 45 and 46 running parallel with the long axis of the brackets and between an edge of the keeper and the adjoining side wall of the bracket.

Positioned axially in advance of the keeper 40 is a guide member 48 welded or otherwise suitably secured to the inner bottom surface of the channel 14, and having a guide slot 50 formed diagonally in an end thereof with a nose portion 52 opposite the middle of the notch 42 in the keeper, the bottommost part 53 of the guide slot being curved and terminating at a point opposite the inner surface of the adjoining side wall 14", and at a point representing the uppermost axial extremity of the small guide channel 46.

A stud 54 is riveted into the bottom of bracket 14 and has a diametrical slot in which is seated the bent end portion 55 of a presser leaf spring 56, which in turn is bent around the stud and has its main body portion extended diagonally across the main channel of the bracket with its upper end portion 57 crimped to bear against the inner surface of a side wall 12" of the inner sliding bracket, and being thus adapted to provide a sliding pressure to prevent chatter of the channel arms as they slide one within the other and also serving the important purpose of pivoting the latch arm 30 from its normal position when the arms are extended in the manner which will be pointed out in greater detail hereafter.

In the operation of the device, the bracket arms may be assumed in collapsed condition and upon the opening of the deck door 10 of Fig. 1, the inner sliding channel bracket 12 will be slid outwardly of the larger channel bracket 14, and as the latching position is approached the latch mechanism will be in the condition seen in Fig. 4. As arm 12 continues its outward movement, the latch arm 30 will be pivoted in a clockwise direction as soon as the depending latch stud 32 bears against the diagonal leaf spring 56 until the stud 32 is substantially in alignment with the side channel 45.

Continued outward movement of the arm 12 will position the depending latch stud 32 at the upper extremity of the small side channel 45 and substantially opposite the nose 52 on the guide plate 48 at which time the leaf spring 33, normally urging the latch arm in an anti-clockwise direction, will cause the latch stud 32 to move into the diagonally directed slot 42 in the latch keeper, further anti-clockwise movement of the pivot arm 30 being prevented by engagement of the stud 32 with the keeper or nose extension 44, and in this condition the arms are in normally extended relation and the latch stud 32 will seat in the bottom of the notch 42 in the keeper and maintain the closure member or deck door 10 in the open dotted line position of Fig. 1, with the latch members disposed as seen in Fig. 3.

In order to unlatch the supporting arms, it is merely necessary to raise the door 10 so as to move the inner channel bracket 12 a slight distance in the direction of its outward or extensible movement, so as to position the latch stud 32 between the end of the keeper nose 44 and the opposite part of the guide track 53, whereupon the spring 33 will further urge the latch arm 30 in an anti-clockwise direction and position the stud 32 at the upper open end of the small channel 46. In this condition the latch system is released and the inner arm may be slid downwardly within its companion, the stud 32 on latch arm 30 riding in the channel 46 and ultimately bearing against the right-hand surface portion of the leaf spring 56 and flexing the latter so as to pass the crimped nose 57 of the same and resume its normal position shown in Fig. 4.

While I have specifically described and illustrated a preferred form of the invention, it is to be understood that various modifications may be made in the same without departing from the spirit of the invention, and I do not desire to be limited to any specific recitations herein except as may be hereinafter provided in the appended claims, which are intended to include all modifications, variations, and equivalents of the structure therein defined.

Having thus described my invention, what I claim as new and desire to protect by Letters Patent is:

1. A supporting bracket including a pair of elongated arms slidable one within the other and having latch means adapted to latch the arms automatically in extended relation and automatically releasable by further extensible movement of said arms to permit movement of the same into collapsed condition, said means including a pivoted latch arm on one of said arms, a latch keeper on the other said arm, and a guide plate cooperable with said keeper to form a tortuous channel disposed in a direction substantially transverse to the movement of said bracket arms, means yieldably urging said latch arm into a normal position and the latter having an extension which is moved into said tortuous channel by movement of said latch arm by said yieldable means when said arms are extended a predetermined distance, said extension seating in said channel to prevent collapsing movement of said arms, said latch arm being urged by said yieldable means to move said extension out of said channel to release said arms for collapsing movement when said arms are moved a slight distance beyond the aforesaid predetermined distance, together with means on one of said arms for guiding said extension into said tortuous channel when the arms are extended.

2. An expansible bracket and automatic latch means therefor comprising a pair of elongated channel arms arranged to slide one within the other, one of said members having a pivoted latch arm with a latch stud extending from an end thereon, and yieldable means normally urging said latch arm to one side of said channel, a latch keeper on the other said channel arm and provided with a stud seat, a guide member positioned across the path of movement of said latch stud toward latched position and effective when said arms are expanded to urge said stud against the tension of said yieldable means into a position at one side of said keeper for movement of said stud into said seat by said yieldable means, and the latter means being operable to move said stud out of latching engagement with said seat upon further extensible movement of said bracket arms.

3. An expansible bracket and automatic latch means therefor comprising a pair of arms slidable one within the other, a latch arm pivoted on one of said arms and having a latch stud extending therefrom, means yieldably urging said latch arm and stud into a normal position on said arm, the other said arm having a latch keeper positioned between its sides and provided at one end with a stud seat, guide means opposite said stud seat on said arm, and means disposed diagonally across the path of movement of said stud when said arms are extended from collapsed condition to position said stud at one side of said keeper for movement into said stud seat by said yieldable means, said guide plate being arranged to stop the extending movement of said members when said stud is at a position substantially opposite said stud seat and the stud being moved by said yieldable means out of said seat for disengagement from said keeper by a slight additional extensive movement of said arms whereupon said arms may be moved into telescoped or collapsed condition.

4. A self-latching expansible supporting bracket including a pair of channel-shaped arms one slidable within the other and each having its bottom portion facing outwardly, a latch arm pivoted at one extremity to the inner bottom surface of one of said arms and at a point substantially intermediate of the sides thereof, said latch arm having a laterally extending latch stud and spring means normally urging the arm and said stud to a position adjacent one of the side walls of said channel arm, the other said arm having a latch keeper disposed on the inner bottom surface between the side walls thereof and having a stud seat in the form of a slot at its extremity farthest from said latch arm when the channel arms are in normally collapsed relation, the opening of said stud seat notch having its open end disposed diagonally across its respective channel arm, a guide plate on said last channel arm opposite said stud seat and adapted to stop the movement of said latch stud in an opening or extending direction when said stud is opposite said stud seat so the stud may be urged by said spring means into the same to prevent collapsing movement of the arms, said stud being movable a slight distance in arm-extending direction after it has moved into said seat and upon such additional movement, being moved out of the stud seat by said spring means whereupon said arms may again be collapsed, together with means disposed diagonally across the path of said latch stud when said arms are extended and operable to guide said latch stud around said latch keeper for movement toward said guide plate.

5. A sliding bracket including a pair of relatively slidable arms forming a central elongated channel and one of the same having an elongated latch arm provided with a latch stud at one extremity and pivotally attached at its opposite extremity centrally in said channel, spring means normally urging said latch arm to one side of said channel, the other said sliding arm having a latch keeper secured thereto between its sides in a position centrally of said channel and adapted to be circumscribed by the latch stud in said latch arm upon the relative reciprocation of said sliding arms, said latch keeper having at one extremity a finger extended from one side thereof in the direction of the long axis of said channel, a guide member beginning from an opposite end of said keeper and extended diagonally across said channel to the side wall thereof nearest said keeper finger, together with a stop attached to the said bracket arm to which said keeper is attached, said stop comprising a member positioned in advance of said keeper substantially across said channel and having a nose portion extended toward said keeper and terminating at a point spaced therefrom and from the end region of said finger.

6. An expansible bracket in accordance with claim 2 and further characterized by the provision of a stop member arranged on said other channel arm with said latch keeper and positioned in advance of the latter in the direction of expanding movement and having a portion arranged to block movement in an expanding direction of said stud whereby to limit the expansion of the bracket members and stop said stud in a position substantially opposite said stud seat for movement into the latter by said yieldable means substantially as set forth.

7. An expansible bracket structure in accordance with claim 2 and further characterized by the provision of a stop member arranged on said other channel arm with said latch keeper and positioned in advance of the latter in the direction of expanding movement and having a portion arranged to block movement in an expanding direction of said stud whereby to limit the expansion of the bracket members and stop said stud in a position substantially opposite said stud seat for movement into the latter by said yieldable means substantially as set forth, said stop member further having a portion arranged in advance of said stud seat in the direction of expanding movement and arranged to limit the aforesaid further extensible movement of said channel arms in moving said stud out of latching engagement with the stud seat.

EDWIN NORTH.